United States Patent Office 3,354,183
Patented Nov. 21, 1967

3,354,183
19-NOR-9β,10α-Δ⁴-ANDROSTENES
Albert Bowers, Atherton, Calif., Pierre Crabbé, Mexico City, Mexico, and John Edwards, Los Altos, Calif., assignors to Syntex Corporation, Panama, Panama, a corporation of Panama
No Drawing. Filed Mar. 8, 1965, Ser. No. 438,065
Claims priority, application Mexico, Dec. 4, 1961, 65,269
10 Claims. (Cl. 260—397.3)

This application is a continuation-in-part of our copending U.S. patent application Ser. No. 210,211, filed July 16, 1962, and now abandoned.

This invention relates to novel cyclopentanopolyhydrophenanthrene derivatives and to processes for the preparation thereof.

More particularly, this invention relates to novel steroid compounds of the 19-norandrostane series having abnormal configuration at the centers of asymmetry of the steroid skeleton, and particularly at carbon atoms 9 and 10, which compounds can be represented by the following general formula:

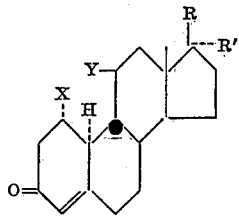

In this formula R represents a hydroxyl group or an acyloxy group, $R^1$ represents hydrogen or a lower alkyl, lower alkenyl or lower alkynyl group containing up to 8 carbon atoms, inclusive, such as methyl, ethyl, propyl, vinyl, ethynyl, propynyl, butynyl, hexynyl, and the like, R and $R^1$ taken together represent a keto group, X represents hydrogen or methyl, and Y represents hydrogen, β-hydroxyl or a keto group, with R being an acyloxy group when Y is a keto group.

The acyloxy and acyl groups referred to herein are preferably derived from hydrocarbon carboxylic acids containing less than 12 carbon atoms. These acids can be saturated or unsaturated (including aromatic), and can have straight or branched aliphatic, cycloaliphatic, cycloaliphatic-substituted aliphatic and aromatic-substituted aliphatic chains. In addition, they can be unsubstituted or substituted with one or more functional groups, such as hydroxyl, alkoxy or amino groups, halogen atoms, and the like. Included among such ester groups are acetate, trimethylacetate, t-butylacetate, phenoxyacetate, aminoacetate, propionate, cyclopentylpropionate, β-chloropropionate, valerate, enanthate, undecenoate and benzoate groups.

The novel 11-desoxy-19-nor-9β,10α-androstane derivatives of the present invention can be prepared by a process which can be illustrated schematically as follows:

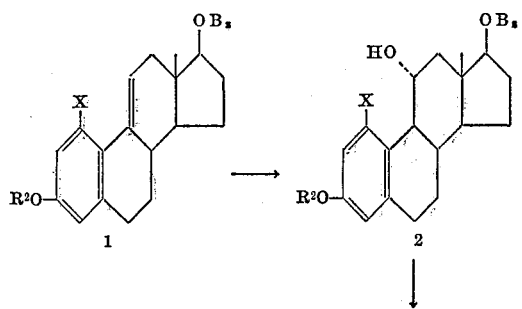

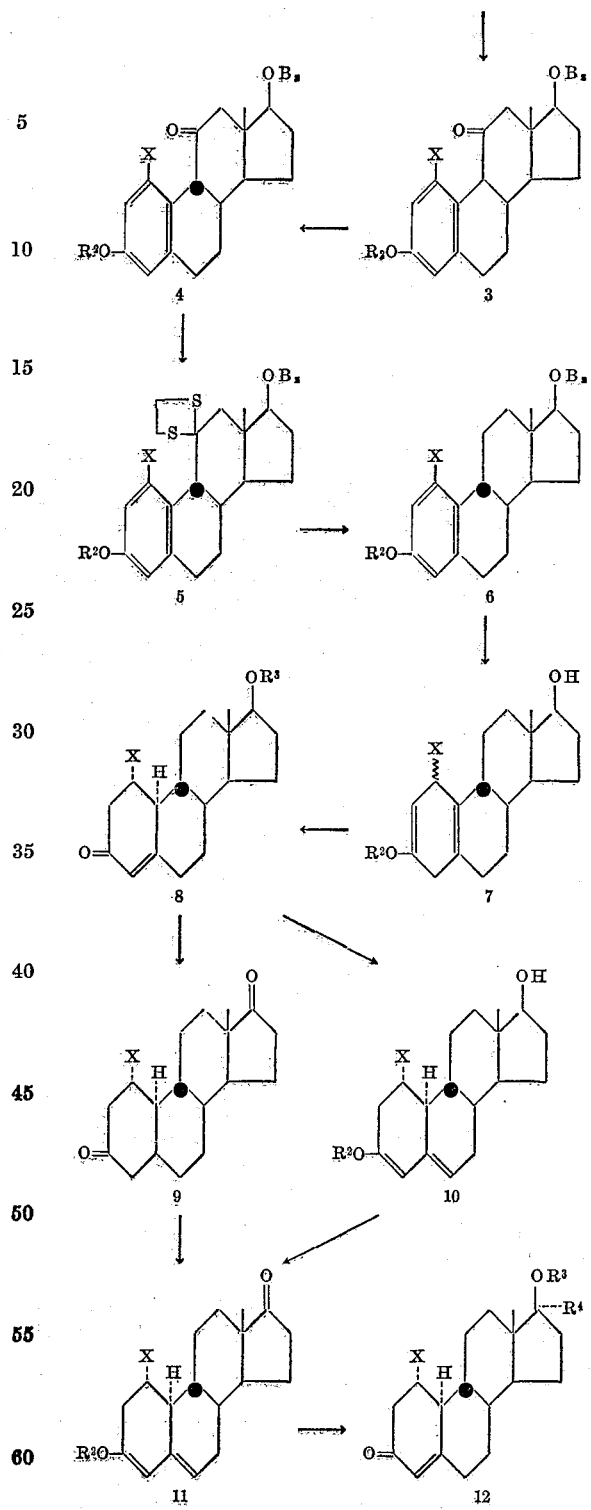

In these formulas X has the same meaning as set forth hereinabove for Formula I, Bz represents a benzoyl group, $R^2$ represents a lower alkyl group, $R^3$ represents hydrogen or an acyl group and $R^4$ represents a lower alkyl, lower alkenyl or lower alkynyl group containing up to 8 carbon atoms, inclusive.

In practicing the above-illustrated process, the 17-benzoate of a 3-lower hydrocarbonoxy-9-dehydroestradiol, e.g., 3 - methoxy-Δ¹,³,⁵(¹⁰),⁹(¹¹)-estratetraen-17β - ol 17-benzoate (1; $R^2$=methyl, X=hydrogen), is treated with a stream of diborane in solution in an inert organic solvent, e.g., an ether such as dioxane, tetrahydrofuran or the like, for a period of time in the order of 1 to 3 hours, and the resulting organoboron compound is then treated with alkaline hydrogen peroxide, in the same solvent, to give the corresponding 11α-hydroxy steroid 2, e.g., 3-methoxy-Δ$^{1,3,5(10)}$ - estratriene - 11α,17β-diol 17 - benzoate (2; R²=methyl, X=hydrogen).

Oxidation of the thus-obtained 11α-hydroxy steroid with 8 N chromic acid in acetone solution gives the corresponding 11-keto steroid 3, e.g., 3-methoxy-Δ$^{1,3,5(10)}$-estratrien-17β-ol-11-one 17-benzoate (3; R²=methyl, X=hydrogen).

Upon treatment of this 11-one with a dilute solution of a strong base in a lower aliphatic alcohol, preferably 1–5% methanolic sodium or potassium hydroxide, at reflux temperature for from about 5–24 hours, under an inert nitrogen atmosphere, the steric configuration at C–9 is inverted, thus producing the corresponding 9β-steroid 4, e.g., 3 - methoxy-9β-Δ$^{1,3,5(10)}$-estratrien-17β-ol-11-one 17-benzoate (4; R²=methyl, X=hydrogen).

The 11-keto function in this 9β-steroid is then eliminated by first forming the corresponding 11-ethylenedithioketal 5, e.g., 3-methoxy-11-cycloethylenedithio-9β-Δ$^{1,3,5(10)}$-estratrien-17β-ol 17-benzoate (5; R²=methyl, X=hydrogen).

This 11-ethylenedithioketal is then refluxed with Raney nickel in ethanol for a period of time in the order of 6 hours, thus giving the corresponding 11-desoxy steroid 6, e.g., 3-methoxy-9β-Δ$^{1,3,5(10)}$-estratrien-17β-ol 17-benzoate (6; R²=methyl, X=hydrogen).

Reduction of the resulting 11-desoxy steroid under Birch conditions, using lithium in liquid ammonia, gives the Δ$^{2,5(10)}$-dien-17β-ol 7, e.g., 3-methoxy-9β-Δ$^{2,5(10)}$-estradien-17β-ol (7; R²=methyl, X=hydrogen).

Acid hydrolysis of the thus-obtained Δ$^{2,5(10)}$-dien-17β-ol gives the 19-nor-9β,10α-Δ⁴-androsten-17β-ol-3-one 8, e.g., 19-nor-9β,10α-Δ⁴-androsten-17β-ol-3-one itself (19-nor-9β,10α-testoster-one, R³ and X=hydrogen).

Oxidation of the 17β-hydroxy group in this 9β,10α-steroid, using chromium trioxide in pyridine at room temperature, gives the corresponding 3,17-dione 9, e.g., 19-nor-9β,10α-Δ⁴-androstene-3,17-dione (9; X=hydrogen).

Where the 17α-lower alkyl, lower alkenyl or lower alkynyl-17β-hydroxy compounds of the present invention are desired, the keto group at C–3 in the 17α-unsubstituted-17β-ol-3-one 8 is protected by formation of an enol ether 10, e.g., 3-ethoxy-19-nor-9β,10α-Δ$^{3,5}$-androstadien-17β-ol (10; R²=ethyl, X=hydrogen), and the free 17β-hydroxy group in this 3-enol ether-17β-ol is then oxidized, using chromium trioxide in pyridine, to give the corresponding 3-enol ether-17-one 11, e.g., 3-ethoxy-19-nor-9β,10α-Δ$^{3,5}$-androstadien-17-one (11; R²=ethyl, X=hydrogen). Next, this 3-enol ether-7-one is reacted with a hydrocarbon magnesium halide, following which the 3-enol ether group is hydrolyzed, thus giving the 17α-lower alkyl, lower alkenyl or lower alkynyl-17β-ol 12, e.g., 17α-methyl-19-nor-9β,10α-Δ⁴-androsten-17β-ol-3-one (12; R³ and X=hydrogen, R⁴=methyl).

Alternatively, the 3-enol ether-17-one 11 can be formed from the 3,17-dione 9.

Esterification of the 17α-unsubstituted-17β-ols 8 with acid anhydrides or chlorides, preferably those containing less than 12 carbon atoms, in pyridine solution, gives the corresponding 17-acylates. Thus, for example, esterification of 19-nor-9β,10α-testosterone with acetic anhydride in pyridine gives the corresponding 17-acetate (8; R³=acetyl, X=hydrogen).

Esterification of the 17α-lower alkyl, lower alkenyl or lower alkynyl-17β-ols 12 is effected with acid anhydrides in benzene solution in the presence of p-toluenesulfonic acid, followed by acid treatment of the acylation reaction mixture, e.g., using a 1–5% methanolic solution of concentrated hydrochloric acid and boiling for from about 1 hour to about 3 hours, to hydrolyze the 3-enol acylate grouping formed during the reaction and regenerate the Δ⁴-3-keto structure. Thus, for example, by esterifying 17α-ethynyl-19-nor-9β,10α-testosterone with acetic anhydride in benzene solution in the presence of p-toluenesulfonic acid, and then adding a 2% methanolic solution of concentrated hydrochloric acid to the acetylation reaction mixture and boiling for 2 hours, the corresponding 17-acetate (12; R³=acetyl, R⁴=ethynyl, X=hydrogen) is formed.

The novel 11-oxygenated-19-nor-9β,10α-androstane derivatives of the present invention can be prepared by processes which can be illustrated schematically as follows:

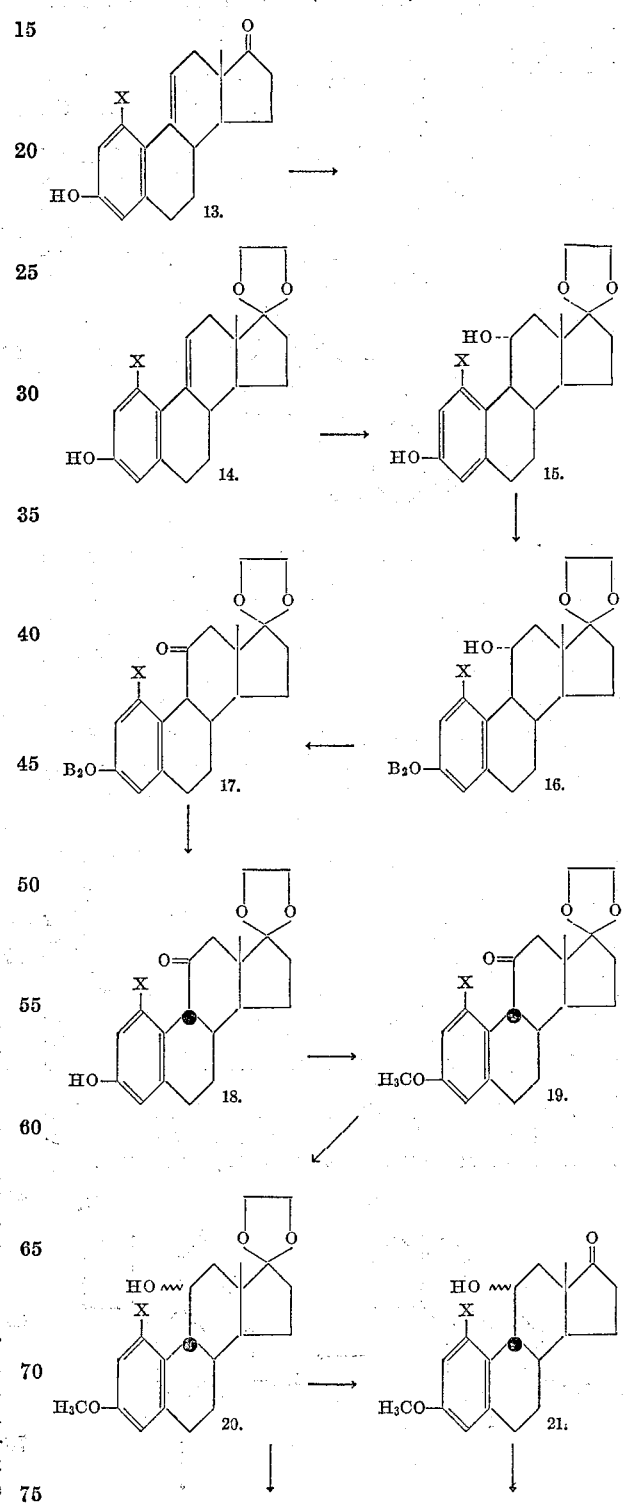

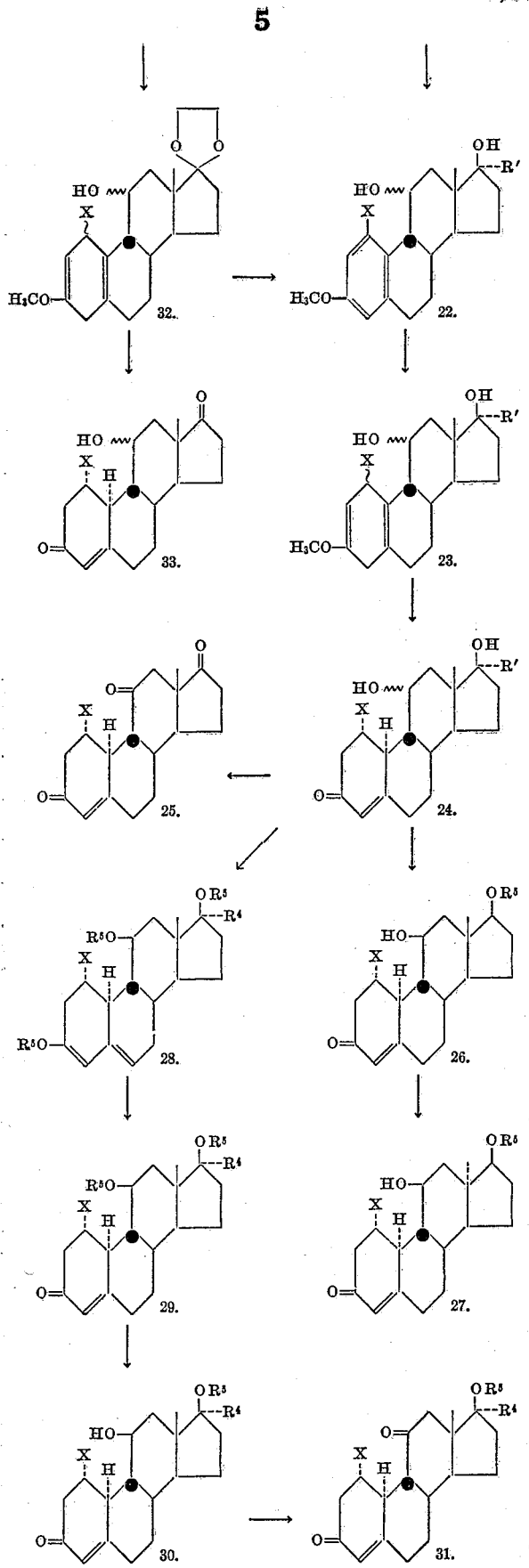

In these formulas X, $R^1$, $R^4$ and Bz have the same meanings as set forth hereinabove for Formulas I, 1 and XII and $R^5$ represents an acyl group.

In practicing the above-illustrated process, the starting material 13, e.g., $\Delta^{1,3,5(10),9(11)}$-estratetraen-3-ol-17-one (13; X=hydrogen), is converted to the corresponding 17-ketal 14, e.g., 17-cycloethylenedioxy-$\Delta^{1,3,5(10),9(11)}$-estratetraen-3-ol (14; X=hydrogen), by treatment with ethylene glycol in benzene solution in the presence of p-toluenesulfonic acid.

The thus-obtained 17-ketal is treated with diborane in tetrahydrofuran or dioxane solution, and then with alkaline hydrogen peroxide, in the manner described hereinabove, to produce the corresponding 3,11α-diol 15, e.g., 17-cycloethylenedioxy-$\Delta^{1,3,5(10)}$-estratriene-3,11α-diol (15; X=hydrogen).

By subjecting this 3,11α-diol to the Schotten-Baumann reaction, i.e., using benzoyl chloride and aqueous sodium hydroxide at room temperature, the corresponding 3-benzoate 16, e.g., 17-cycloethylenedioxy-$\Delta^{1,3,5(10)}$-estratrien-3,11α-diol 3-benzoate (16; X=hydrogen), is obtained.

Oxidation of the 11α-hydroxyl group in the thus-obtained 3-benzoate is then accomplished by using chromium trioxide in pyridine at room temperature, thus giving the corresponding 11-keto steroid 17, e.g., 17-cycloethylenedioxy-$\Delta^{1,3,5,(10)}$-estratrien-3-ol-11-one 3-benzoate (17; X=hydrogen).

Upon treatment of this 11-one with a dilute solution of a strong base in a lower aliphatic alcohol, preferably 5% methanolic sodium or potassium hydroxide, at reflux temperature, under an inert nitrogen atmosphere, for from about 5–24 hours, the steric configuration at C–9 is inverted and the benzoyloxy group at C–3 is hydrolyzed, thus producing the 3-hydroxy-9β-steroid 18, e.g., 17-cycloethylenedioxy-9β-$\Delta^{1,3,5(10)}$-estratrien-3-ol-11-one (18; X=hydrogen).

Treatment of this 3-hydroxy-9β-steroid with dimethyl sulfate in acetone solution in the presence of potassium carbonate gives the corresponding 3-methyl ether 19, e.g., 3-methoxy-17-cycloethylenedioxy-9β-$\Delta^{1,3,5(10)}$-estratrien-11-one (19; X=hydrogen).

The 11-keto group in the thus-produced 3-methyl ether is reduced by dissolving the steroid in an inert organic solvent, e.g., an ether such as dioxane or tetrahydrofuran, and the like, and reacting under neutral conditions with a metal hydride, e.g., lithium aluminum hydride, lithium tri(t-butoxy)aluminum hydride, and the like, thus giving a mixture of 11α- and 11β-alcohols 20, e.g., 3-methoxy-17-cycloethylenedioxy-9β-$\Delta^{1,3,5(10)}$-estratrien-11α-ol and 3-methoxy-17-cycloethylenedioxy-9β-$\Delta^{1,3,5(10)}$-estratrien-11β-ol (20; X=hydrogen), which can either be separated chromatographically or by fractional crystallization (as is the case with any of the subsequently obtained mixtures of 11α- and 11β-ols) at this point, or used as such in the remaining steps.

Acid hydrolysis of the thus-obtained 3-methoxy-11(α and/or β)-ol-17-ketal, using 1–5% hydrochloric acid in methanol or aqueous acetone, gives the corresponding 17-keto steroid 21, e.g., 3-methoxy-9β-$\Delta^{1,3,5(10)}$-estratrien-11β-ol-17-one (21; X=hydrogen).

When 17α-unsubstituted-17β-ols are desired, the resulting 17-keto steroid can be reduced with lithium aluminum hydride or sodium borohydride under neutral conditions in an inert organic solvent, e.g., an ether such as dioxane, tetrahydrofuran, and the like, thus giving the corresponding 17β-ol 22, e.g., 3-methoxy-9β-$\Delta^{1,3,5(10)}$-estratriene-11β,17β-diol (22; $R^1$ and X=hydrogen).

When the 17α-lower alkyl, alkenyl or alkynyl-17β-ols are desired, the 17-keto steroid 21 is reacted with the appropriate hydrocarbon magnesium halide in the manner described hereinabove, thus giving the corresponding 17α-lower alkyl, alkenyl or alkynyl-17β-ol 22, e.g., 3-methoxy-17α-methyl-9β-$\Delta^{1,3,5(10)}$-estratriene-11β,17β-diol (22; $R^1$= methyl, X=hydrogen).

Reduction of the 17β-hydroxy steroid 22 under Birch conditions, using lithium in liquid ammonia, gives the $\Delta^{2,5(10)}$-dien-17β-ol 23, e.g., 3-methoxy-9β-$\Delta^{2,5(10)}$-estradiene 11β,17β-diol (23; $R^1$ and X=hydrogen).

Acid hydrolysis of the thus-obtained $\Delta^{2,5(10)}$-diene-11,

17β-diol gives the corresponding 19-nor-9β,10α-Δ⁴-androstene-11,17β-diol-3-one 24, e.g., 19-nor-9β,10α-Δ⁴-androstene-11β,17β-diol-3-one (24; R¹ and X=hydrogen).

Where there is no 17α-substituent, the thus-obtained 11,17β-diol can be oxidized, using chromium trioxide in pyridine at room temperature, to give the corresponding 3,11,17-trione 25, e.g., 19-nor-9β,10α-Δ⁴-androstene-3,11,17-trione (25; X=hydrogen).

Similarly, where there is no 17α-substituent, an 11β,17β-diol 24 can be esterified, using approximately 1.1 mols of acid anhydride in pyridine, to give the corresponding 17-monoester 26, e.g., 19-nor-9β,10α-Δ⁴-androstene-11β,17β-diol-3-one 17-acetate (26; R⁵=acetyl, X=hydrogen).

The 11β-hydroxyl group in this 17-monoacetate can be oxidized, using chromium trioxide in pyridine at room temperature, thus giving the corresponding 11-keto steroid 27, e.g., 19-nor-9β,10α-Δ⁴-androsten-17β-ol-3,11-dione 17-acetate (27; R³=acetyl, X=hydrogen).

Where the 11β,17β-diol 24 has a 17α-substituent, it can be converted to the corresponding 17-monoester by first reacting with an acid anhydride in benzene solution in the presence of p-toluenesulfonic acid to give the corresponding 3-enol acylate-Δ³,⁵-11,17-diacylate 28. Thus, for example, the reaction of 17α-methyl-19-nor-9β,10α-Δ⁴-androstene-11β,17β-diol-3-one with acetic anhydride in benzene solution in the presence of p-toluenesulfonic acid gives 17α-methyl-19-nor-9β,10α-Δ³,⁵-androstadiene-3,11β,17β-triol 3,11,17-triacetate (28; R⁴=methyl, R⁵=acetyl, X=hydrogen).

This 3-enol acylate is then converted to the corresponding Δ⁴-3-keto 11,17-diester 29, e.g., 17α-methyl-19-nor-9β,10α-Δ⁴-androstene-11β,17β-diol-3-one 11,17-diacetate (29; R⁴=methyl, R⁵=acetyl, X=hydrogen), by hydrolysis with an aqueous methanolic 5% hydrochloric acid solution.

By hydrolyzing the thus-obtained 11,17-diester with a 1-5% solution of sodium or potassium bicarbonate in aqueous methanol at 0-20° C. for 1-18 hours, the corresponding 17-monoester 30, e.g. 17α-methyl-19-nor-9β,10α - Δ⁴-androstene - 11β,17β-diol-3-one 17-acetate (30; R⁵=methyl, R⁵=acetyl, X=hydrogen), is obtained.

Oxidation of this 17-monoester with chromium trioxide in pyridine at room temperature gives the corresponding 11-keto steroid 31, e.g., 17α-methyl-19-nor-9β,10α-Δ⁴-androstene-17β-ol-3,11-dione 17-acetate (31; R³=acetyl, R⁴=methyl, X=hydrogen).

By reducing the 3-methoxy-17-cycloethylenedioxy-9β-Δ¹,³,⁵(¹⁰)-estratrien-11-ol 20 under Birch conditions, using lithium in liquid ammonia, the corresponding 2,5(10)-diene 32, e.g., 3 - methoxy - 17 - cycloethylenedioxy-9β-Δ²,⁵(¹⁰)-estradien-11β-ol (32; X=hydrogen), is obtained.

Acid hydrolysis of this Δ²,⁵(¹⁰)-diene in the manner described hereinabove removes the productive groupings at C-3 and C-17, thus giving the corresponding 3,17-dione 33, e.g., 19-nor-9β,10α-Δ⁴-androsten-11β-ol-3,17-dione (33; X=hydrogen).

The novel 17α-unsubstituted and 17α-lower alkyl steroids represented by Formula I hereinabove are anabolic-androgenic agents having a favorable anabolic/androgenic ratio. In addition, they have anti-estrogenic activity, suppress the output gonadotrophin by the pituitary gland, and lower blood chloesterol levels.

The novel 17α-lower alkenyl and 17α-lower alkynyl steroids represented by Formula I hereinabove are progestational agents which also have estrogenic activity, and thus are useful in fertility control in humans and animals. They also suppress the output of gonadotrophin by the pituitary gland and lower blood cholesterol levels.

In order that those skilled in the art can more fully understand the present invention, the following examples are set forth. These examples are given solely for the purpose of illustrating the invention, and should not be considered as expressing limitations unless so set forth in the appended claims.

*Example I*

A stream of diborane was passed through a solution of 15 grams of 3-methoxy-Δ¹,³,⁵(¹⁰),⁹(¹¹)-estratetraen-17β-ol 17-benzoate in 375 cc. of anhydrous tetrahydrofuran for 3 hours, following which the reaction mixture was allowed to stand at room temperature overnight under anhydrous conditions. Following this reaction period excess diborane was destroyed by the addition of water, and the resulting solution was then cooled to —5° C. and treated dropwise with 750 mg. of sodium hydroxide in 6 cc. of water and 90 cc. of 35% hydrogen peroxide. The resulting reaction mixture was stirred for 1 hour, then neutralized with acetic acid and extracted with methylene dichloride. The thus-obtained extract was washed with water, dried over anhydrous sodium sulfate and evaporated to dryness. Chromatography of the resulting residue on 750 grams of washed alumina, followed by crystallization of the solid fractions from acetone/hexane, gave 3-methoxy-Δ¹,³,⁵(¹⁰)-estratriene-11α,17β-diol 17-benzoate.

By repeating this procedure using 1-methyl-3-methoxy-Δ¹,³,⁵(¹⁰),⁹(¹¹) - estratetraen - 17β - ol 17-benzoate as the steroid starting material, 1-methyl-3-methoxy-Δ¹,³,⁵(¹⁰)-estratriene-11α,17β-diol 17-benzoate was obtained.

*Example II*

A solution of 10 grams of 3-methoxy-Δ¹,³,⁵(¹⁰)-estratriene-11α,17β-diol 17-benzoate in 200 cc. of acetone, contained under an inert nitrogen atmosphere, was cooled to 0° C. and treated, with stirring, with an 8 N solution of chromic acid (prepared by admixing 26 grams of chromium trioxide with 23 cc. of concentrated sulfuric acid and then diluting with water to 100 cc.) until the color of the reagent persisted in the reaction mixture. At this point, the reaction mixture was stirred for an additional 5 minutes at 0-5° C., then diluted with water. The resulting precipitate was collected by filtration, washed with water and dried under vacuum, thus affording a crude product which, upon recrystallization from acetone/hexane, gave 3-methoxy-Δ¹,³,⁵(¹⁰)-estratrien-17β-ol-11-one 17-benzoate.

By repeating this procedure using 1-methyl-3-methoxy-Δ¹,³,⁵(¹⁰) - estratriene - 11α,17β - diol 17-benzoate as the steroid starting material, 1-methyl-3-methoxy-Δ¹,³,⁵(¹⁰)-estratrien-17β-ol-11-one 17-benzoate was obtained.

*Example III*

A mixture of 5 grams of 3-methoxy-Δ¹,³,⁵(¹⁰)-estratrien-17β-ol-11-one 17-benzoate and 400 cc. of a 1% methanolic potassium hydroxide solution, contained under an inert nitrogen atmosphere, was refluxed for 5 hours. Following this reaction period the reaction mixture was cooled to room temperature, diluted with water and extracted with methylene dichloride. The thus-obtained extract was washed with water until neutral, then dried over anhydrous sodium sulfate and evaporated to dryness, thus giving 3-methoxy-9β-Δ¹,³,⁵(¹⁰)-estratrien-17β-ol-11-one 17-benzoate.

By repeating this procedure using 1-methoxy-3-methoxy-Δ¹,³,⁵(¹⁰)-estratrien-17β-ol-11-one 17-benzoate as the steroid starting material, the corresponding 9β-isomer was obtained.

*Example IV*

A solution of 5 grams of 3-methoxy-9β-Δ¹,³,⁵(¹⁰)-estratrien-17β-ol-11-one 17-benzoate in 100 cc. of glacial acetic acid containing 5 cc. of ethanedithiol was admixed with 4 cc. of a saturated solution of hydrochloric acid in acetic acid, and the resulting reaction mixture was allowed to stand at room temperature for 4 hours. Following this reaction period the reaction mixture was diluted with water and extracted with ethyl acetate. The thus-obtained extract was washed with an aqueous 5% sodium bicarbonate solution and then with water until neutral, then dried over anhydrous sodium sulfate and evaporated to dryness under vacuum. Recrystallization of the resulting residue from diethyl ether/hexane gave 3-methoxy-11-cycloethylenedithio-9β-$\Delta^{1,3,5(10)}$-estratrien-17β-ol 17-benzoate.

A solution of 4 grams of the thus-obtained 11-cycloethylene-dithioketal in 3 liters of ethanol (which had previously been distilled from Raney nickel) was admixed with 50 grams of Raney nickel, and the resulting reaction mixture was refluxed for 6 hours. Following this reaction period the Raney nickel was removed by filtration, then washed with hot ethanol, and these washings were added to the filtrate. The filtrate and washings were then evaporated to dryness and the resulting residue was dissolved in chloroform and washed with dilute hydrochloric acid, then with an aqueous sodium carbonate solution and finally with water until neutral. The neutral solution was then dried over anhydrous sodium sulfate and evaporated to dryness. Recrystallization from acetone/hexane gave 3-methoxy-9β-$\Delta^{1,3,5(10)}$-estratrien-17β-ol 17-benzoate.

By repeating this entire procedure using 1-methyl-3-methoxy-9β-$\Delta^{1,3,5(10)}$-estratrien-17β-ol-11-one 17-benzoate as the steroid starting material, 1-methyl-3-methoxy-11-cycloethylenedithio-9β-$\Delta^{1,3,5(10)}$-estratrien-17β-ol 17 - benzoate and then 1-methyl-3-methoxy-9β-$\Delta^{1,3,5(10)}$-estratrien-17β-ol 17-benzoate, respectively, were obtained.

*Example V*

A cold solution of 2 grams of 3-methoxy-9β-$\Delta^{1,3,5(10)}$-estratrien-17β-ol 17-benzoate in 250 cc. of anhydrous diethyl ether was slowly added, with stirring, to a solution of 2.6 grams of lithium metal in 300 cc. of liquid ammonia, and the resulting reaction mixture was stirred, following this addition, for 30 minutes. At this point 60 cc. of absolute ethanol were cautiously added (until decolorization occurred), and then the ammonia and diethyl ether were removed by evaporation. Water was then added and the resulting solid was collected by filtration, washed with water and dried, thus giving 3-methoxy-9β-$\Delta^{2,5(10)}$-estradien-17β-ol.

By repeating this procedure using 1-methyl-3-methoxy-9β-$\Delta^{1,3,5(10)}$-estratrien-17β-ol 17-benzoate as the steroid starting material, 1-methyl-3-methoxy-9β - $\Delta^{2,5(10)}$ - estradien-17β-ol was obtained.

*Example VI*

The 3-methoxy-9β-$\Delta^{2,5(10)}$-estradien-17β-ol obtained as described in Example V hereinabove was dissolved in 75 cc. of methanol and admixed with 40 cc. of 3 N hydrochloric acid, and the resulting reaction mixture was refluxed for 20 minutes. Following this reaction period the reaction mixture was cooled to room temperature and poured into ice water. The thus-formed precipitate was collected by filtration, washed with water and dried. Chromatography of the thus-obtained crude product on 50 times its weight of washed alumina gave 19-nor-9β,10α-$\Delta^4$-androsten-17β-ol-3-one (19-nor-9β,10α - testosterone).

By repeating this procedure using 1-methyl-3-methoxy-9β-$\Delta^{2,5(10)}$-estradien-17β-ol as the steroid starting material, 1α-methyl-19-nor-9β,10α-$\Delta^4$-androsten-17β-ol-3-one (1α-methyl-19-nor-9β,10α-testosterone) was obtained.

*Example VII*

A solution of 1 gram of 19-nor-9β,10α-$\Delta^4$-androsten-17β-ol-3-one in 20 cc. of pyridine was admixed with 1 gram of chromium trioxide in 20 cc. of pyridine, and the resulting reaction mixture was allowed to stand at room temperature overnight. Following this reaction period the reaction mixture was diluted with ethyl acetate and filtered through Celite. The filtrate was then washed with water, dried over anhydrous sodium sulfate and evaporated to dryness. Crystallization from acetone/hexane gave 19-nor-9β,10α-$\Delta^4$-androstene-3,17-dione.

By repeating this procedure using 1α-methyl-19-nor-9β,10α-$\Delta^4$-androsten-17β-ol-3-one as the steroid starting material, 1α-methyl-19-nor-9β,10α-$\Delta^4$ - androstene - 3,17-dione was obtained.

*Example VIII*

A solution of 5 grams of 19-nor-9β,10α-$\Delta^4$-androsten-17β-ol-3-one in 200 cc. of anhydrous, peroxide-free dioxane was admixed with 6 cc. of freshly distilled ethyl orthoformate and 4 grams of p-toluenesulfonic acid, and the resulting reaction mixture was stirred at room temperature for 15 minutes and then allowed to stand at room temperature for an additional 30 minutes. At this point, 4 cc. of pyridine were added and the solution was then diluted with water. The resulting precipitate was collected by filtration, washed with water and air-dried. Recrystallization from acetone/hexane gave 3 - ethoxy-19 - nor-9β,10α-$\Delta^{3,5}$-androstadien-17β-ol.

By repeating this procedure using 1α-methyl-19-nor-9β,10α-$\Delta^4$-androsten-17β-ol-3-one as the steroid starting material, 1α-methyl-3-ethoxy-19-nor-9β,10α-$\Delta^{3,5}$-androstadien-17β-ol was obtained.

*Example IX*

The 3-enol ethers prepared as described in Example VIII hereinabove were oxidized, using chromium trioxide in pyridine in the manner described in Example VII hereinabove, thus giving 3-ethoxy-19-nor-9β,10α-$\Delta^{3,5}$-androstadien-17-one and 1α-methyl-3-ethoxy-19-nor-9β,10α-$\Delta^{3,5}$-androstadien-17-one, respectively.

*Example X*

A solution of 1 gram of 3-ethoxy-18-nor-9β,10α-$\Delta^{3,5}$-androstadien-17-one in 250 cc. of thiophene-free benzene was admixed with 27.5 cc. of a 4 N solution of methylmagnesium bromide in diethyl ether, and the resulting reaction mixture was refluxed, excluding moisture, for 3 hours. Following this reaction period the reaction mixture was cooled to room temperature, cautiously poured into a dilute hydrochloric acid solution, and then extracted with ethyl acetate. The thus-obtained extract was washed with water, dried over anhydrous sodium sulfate and evaporated to dryness under reduced pressure, thus giving an oily residue which was then dissolved in 20 cc. of acetone.

To this solution there were then added 100 mg. of p-toluenesulfonic acid, and the resultnig reaction mixture was allowed to stand at room temperature for 4 hours. Following this reaction period the reaction mixture was diluted with water and then extracted with methylene dichloride. The thus-obtained extract was washed with water until neutral, then dried over anhydrous sodium sulfate and evaporated to dryness. Crystallization of the resulting residue from acetone/hexane gave 17α-methyl-19-nor-9β,10α-$\Delta^4$-androsten-17β-ol-3-one.

By repeating this entire procedure using 1α-methyl-3-ethoxy-19-nor-9β,10α-$\Delta^{3,5}$ - androstadien - 17 - one as the steroid starting material, 1α,17α-dimethyl-19-nor-9β,10α-$\Delta^4$-androsten-17β-ol-3-one was obtained.

Similarly, by repeating this entire procedure using the two steroid starting materials just mentioned and replacing methylmagnesium bromide with equivalent amounts of ethylmagnesium bromide, vinylmagnesium bromide, ethynylmagnesium bromide and propargylmagnesium bromide, the corresponding 17α-substituted steroids, namely, 17α-ethyl-19-nor-9β,10α-$\Delta^4$-androsten-17β-ol-3-one,
17α-vinyl-19-nor-9β,10α-$\Delta^4$-androsten-17β-ol-3-one,
17α-ethynyl-19-nor-9β,10α-$\Delta^4$-androsten-17β-ol-3-one,
17α-propargyl-19-nor-9β,10α-$\Delta^4$-androsten-17β-ol-3-one,
1α-methyl-17α-ethyl-19-nor-9β,10α-$\Delta^4$-androsten-17β-ol-3-one,
1α-methyl-17α-vinyl-19-nor-9β,10α-$\Delta^4$-androsten-17β-ol-3-one,
1α-methyl-17α-ethynyl-19-nor-9β,10α-$\Delta^4$-androsten-17β-ol-3-one, and
1α-methyl-17α-propargyl-19-nor-9β,10α-$\Delta^4$-androsten-17β-ol-3-one, respectively, were obtained.

Example XI

A mixture of 1 gram of 19-nor-9β,10α-Δ⁴-androsten-17β-ol-3-one, 4 cc. of pyridine and 2 cc. of acetic anhydride was allowed to stand at room temperature overnight. Following this reaction period the reaction mixture was poured into ice water and the resulting precipitate was collected by filtration, washed with water and dried. Crystallization from acetone/hexane gave 19-nor-9β,10α-Δ⁴-androsten-17β-ol-3-one 17-acetate.

By repeating this procedure using 1α-methyl-19-nor-9β,10α-Δ⁴-androsten-17β-ol-3-one as the steroid starting material, the corresponding 17-acetate was obtained.

Similarly, by repeating this procedure using each of the steroid starting materials just mentioned and replacing acetic anhydride with propionic, cyclopentylpropionic and caproic anhydride, respectively, the corresponding 17-propionates, -cyclopentylpropionates and -caproates were obtained.

Example XII

To a solution of 2 grams of 17α-methyl-19-nor-9β,10α-Δ⁴-androsten-17β-ol-3-one in 40 cc. of anhydrous benzene there were added 400 mg. of p-toluenesulfonic acid and 4 cc. of acetic anhydride, and the resulting reaction mixture was allowed to stand at room temperature for 24 hours. Following this reaction period the reaction mixture was poured into ice water and stirred to effect hydrolysis of excess acetic anhydride. Next, the benzene layer was separated, washed with an aqueous 10% sodium carbonate solution and then with water, then dried over anhydrous sodium sulfate and evaporated to dryness. Crystallization of the residue from diethyl ether/hexane gave 17α-methyl-19-nor-9β,10α-Δ³,⁵-androstadiene-3,17β-diol 3,17-diacetate admixed with a minor amount of 17α-methyl-19-nor-9β,10α-Δ³,⁵-androstadiene-3,17β-diol 3-acetate.

One gram of the thus-obtained mixture was dissolved in 50 ml. of methanol and admixed with 1 ml. of concentrated hydrochloric acid, and the resulting reaction mixture was then refluxed for 2 hours. Following this reaction period the reaction mixture was cooled, neutralized with aqueous sodium bicarbonate solution and diluted with water. The resulting precipitate was collected by filtration, washed with water and dried. Chromatography on alumina followed by recrystallization from diethyl ether/hexane gave 17α-methyl-19-nor-9β,10α-Δ⁴-androsten-17β-ol-3-one 17-acetate.

By repeating this entire procedure using the remaining 17α-substituted steroids prepared as described in Example X hereinabove, the corresponding 17-acetates were obtained.

Similarly, by repeating this entire procedure using each of the 17α-substituted steroids prepared as described in Example X hereinabove as the steroid starting materials and replacing acetic anhydride with propionic, cyclopentylpropionic and caproic anhydride, respectively, the corresponding 17-propionates, -cyclopentylproprionates and -caproates were obtained.

Example XIII

A mixture of 1 gram of Δ¹,³,⁵⁽¹⁰⁾,⁹⁽¹¹⁾-estratetraen-3-ol-17-one, 25 cc. of dry benzene, 5 cc. of ethylene glycol and 50 mg. of p-toluenesulfonic acid monohydrate was refluxed for 16 hours, using a water separator to remove the water formed during the reaction. Folowing this reaction period the reaction mixture was washed with an aqueous sodium bicarbonate solution and then with water, then dried over anhydrous sodium sulfate and evaporated to dryness. Recrystallization from acetone/hexane gave 17-cycloethylenedioxy-Δ¹,³,⁵⁽¹⁰⁾,⁹⁽¹¹⁾-estratetraen-3-ol.

By repeating this procedure using 1-methyl-Δ¹,³,⁵⁽¹⁰⁾,⁹⁽¹¹⁾-estratetraen-3-ol-17-one as the steroid starting material, 1-methyl-17-cycloethylenedioxy-Δ¹,³,⁵⁽¹⁰⁾,⁹⁽¹¹⁾-estratetraen-3-ol was obtained.

Example XIV

The 17-ketals prepared as described in Example XIII hereinabove were treated with diborane in tetrahydrofuran solution and then with alkaline hydrogen peroxide in the manner described in Example I hereinabove, thus giving 17-cycloethylenedioxy-Δ¹,³,⁵⁽¹⁰⁾-estratriene-3,11α-diol and 1-methyl-17-cycloethylenedioxy-Δ¹,³,⁵⁽¹⁰⁾-estratriene-3,11α-diol.

Example XV

On gram of 17-cycloethylenedioxy-Δ¹,³,⁵⁽¹⁰⁾-estratriene-3,11α-diol in 100 ml. of an aqueous 10% solution of sodium hydroxide was admixed at room temperature, with stirring, with 20 molar equivalents of benzoyl chloride. The resulting precipitate was collected by filtration, washed with water until neutral and recrystallized from acetone/hexane, thus giving 17-cycloethylenedioxy-Δ¹,³,⁵⁽¹⁰⁾-estratriene-3,11α-diol 3-benzoate.

By repeating this procedure using 1-methyl-17-cycloethylenedioxy-Δ¹,³,⁵⁽¹⁰⁾-estratriene-3,11α-diol as the steroid starting material, the corresponding 3-benzoate was obtained.

Example XVI 17-cycloethylenedioxy-Δ¹,³,⁵⁽¹⁰⁾-estratriene-3,11α-diol and corresponding 1-methyl steroid were oxidized, using chronium trioxide in pyridine in the manner described in Example VII hereinabove, thus giving 17-cycloethylenedioxy-Δ¹,³,⁵⁽¹⁰⁾-estratrien-3-ol-11-one 3-benzoate and 1-methyl-17-cycloethylenedioxy-Δ¹,³,⁵⁽¹⁰⁾-estratrien-3-ol-11-one 3-benzoate.

Example XVII

The 11-keto steroids prepared as described in Example XVI hereinabove were treated with a 1% methanolic potassium hydroxide solution in the manner described in Example III hereinabove, thus giving 17-cycloethylenedioxy-9β-Δ¹,³,⁵⁽¹⁰⁾-estratrien-3-ol-11-one and 1-methyl-17-cycloethylenedioxy-9β-Δ¹,³,⁵⁽¹⁰⁾-estratrien-3-ol-11-one, respectively.

Example XVIII

A mixture of 5 grams of 17-cycloethylenedioxy-9β-Δ¹,³,⁵⁽¹⁰⁾-estratrien-3-ol-11-one, 25 cc. of acetone, 70 grams of potassium hydroxide and 37.5 cc. of water was treated dropwise, with stirring, with 10 cc. of dimethyl sulfate, and the resulting reaction mixture was stirred, following this addition, for 45 minutes at room temperature. Following this reaction period the reaction mixture was poured into a dilute hydrochloric acid solution and the resulting precipitate was collected by filtration, washed with water until neutral and dried. Recrystallization from chloroform/methanol gave 3-methoxy-17-cycloethylenedioxy-9β-Δ¹,³,⁵⁽¹⁰⁾-estratrien-11-one.

By repeating this procedure using 1-methyl-17-cycloethylenedioxy-9β-Δ¹,³,⁵⁽¹⁰⁾-estratrien-3-ol-11-one as the steroid starting material, the corresponding 3-methyl ether was obtained.

Example XIX

A solution of 1 gram of 3-methoxy-17-cycloethylenedioxy-9β-Δ¹,³,⁵⁽¹⁰⁾-estratrien-11-one in 30 cc. of anhydrous tetrahydrofuran was slowly added, with stirring, to a suspension of 1 gram of lithium aluminum hydride in 50 cc. of anhydrous tetrahydrofuran, and the resulting reaction mixture was refluxed for 2 hours. Following this reaction period the reaction mixture was cooled and excess lithium aluminum hydride was destroyed by the addition of 5 cc. of ethyl acetate and 2 cc. of water. Next, a saturated solution of sodium sulfate and solid sodium sulfate were added, the inorganic material was filtered off and washed with hot ethyl acetate, and these washings were added to the filtrate. The filtrate was then evaporated to dryness and the resulting residue was crystallized from acetone/hexane, thus giving a mixture of 3-methoxy-17-cycloethylenedioxy-9β-Δ¹,³,⁵⁽¹⁰⁾-estratrien-11α-ol and 3- methoxy-17-cycloethylenedioxy - $9\beta$ - $\Delta^{1,3,5(10)}$ - estratrien-$11\beta$-ol.

Similarly, by repeating this procedure using 1-methyl-3-methoxy-17-cycloethylenedioxy - $9\beta$-$\Delta^{1,3,5(10)}$-estratrien-11-one as the steroid starting material, a mixture of the corresponding $11\alpha$- and $11\beta$-ols was obtained.

The thus-obtained mixtures of $11\alpha$- and $11\beta$-ols were then separated into the individual isomers by chromatography on alumina.

*Example XX*

A solution of 1 gram of 3-methoxy-17-cycloethylenedioxy-$9\beta$-$\Delta^{1,3,5(10)}$-estratrien-$11\beta$-ol in 50 cc. of acetone was admixed with 0.2 cc. of concentrated hydrochloric acid, and the resulting reaction mixture was allowed to stand at room temperature overnight. Following this reaction period the reaction mixture was poured into water and extracted with methylene dichloride. The thus-obtained extract was washed with water until neutral, then dried over anhydrous sodium sulfate and evaporated to dryness. Crystallization from acetone/hexane gave 3-methoxy-$9\beta$-$\Delta^{1,3,5(10)}$-estratrien-$11\beta$-ol-17-one.

By repeating this procedure using 1-methyl-3-methoxy-17-cycloethylenedioxy-$9\beta$-$\Delta^{1,3,5(10)}$-estratrien-$11\beta$-ol as the steroid starting material, 1-methyl-3-methoxy-$9\beta$-$\Delta^{1,3,5(10)}$-estratrien-$11\beta$-ol-17-one was obtained.

*Example XXI*

The 17-ones prepared as described in Example XX hereinabove were reduced, using lithium aluminum hydride in tetrahydrofuran solution in the manner described in Example XIX hereinabove, thus giving 3-methoxy-$9\beta$-$\Delta^{1,3,5(10)}$-estratriene-$11\beta,17\beta$-diol and 1-methyl-3-methoxy-$9\beta$-$\Delta^{1,3,5(10)}$-estratriene-$11\beta,17\beta$-diol.

*Example XXII*

The 17-ones prepared as described in Example XX hereinabove were reacted with methylmagnesium bromide, ethylmagnesium bromide, vinylmagnesium bromide, ethynylmagnesium bromide and propargylmagnesium bromide in dethyl ether in the manner described in Example X hereinabove, thus giving the corresponding $17\alpha$-substituted steroids, namely, 3-methoxy-$17\alpha$-methyl-$9\beta$-$\Delta^{1,3,5(10)}$-estratriene-$11\beta,17\beta$-diol,
3-methoxy-$17\alpha$-ethyl-$9\beta$-$\Delta^{1,3,5(10)}$-estratriene-$11\beta,17\beta$-diol,
3-methoxy-$17\alpha$-vinyl-$9\beta$-$\Delta^{1,3,5(10)}$-estratriene-$11\beta,17\beta$-diol,
3-methoxy-$17\alpha$-ethynyl-$9\beta$-$\Delta^{1,3,5(10)}$-estratriene-$11\beta,17\beta$-diol,
3-methoxy-$17\alpha$-propargyl-$9\beta$-$\Delta^{1,3,5(10)}$-estratriene-$11\beta,17\beta$-diol,
3-methoxy-1,$17\alpha$-dimethyl-$9\beta$-$\Delta^{1,3,5(10)}$-estratriene-$11\beta,17\beta$-diol,
1-methyl-3-methoxy-$17\alpha$-ethyl-$9\beta$-$\Delta^{1,3,5(10)}$-estratriene-$11\beta,17\beta$-diol,
1-methyl-3-methoxy-$17\alpha$-vinyl-$9\beta$-$\Delta^{1,3,5(10)}$-estratriene-$11\beta,17\beta$-diol,
1-methyl-3-methoxy-$17\alpha$-ethynyl-$9\beta$-$\Delta^{1,3,5(10)}$-estratriene-$11\beta,17\beta$-diol, and
1-methyl-3-methoxy-$17\alpha$-propargyl-$9\beta$-$\Delta^{1,3,5(10)}$-estratriene-$11\beta,17\beta$-diol, respectively.

*Example XXIII*

The $17\beta$-hydroxy steroids prepared as described in Examples XXI and XXII hereinabove were reduced, using lithium in liquid ammonia in the manner described in Example V hereinabove, thus giving the corresponding $\Delta^{2,5(10)}$-dienes, namely, 3-methoxy-$9\beta$-$\Delta^{2,5(10)}$-estradiene-$11\beta,17\beta$-diol,
1-methyl-3-methoxy-$9\beta$-$\Delta^{2,5(10)}$-estradiene-$11\beta,17\beta$-diol,
3-methoxy-$17\alpha$-methyl-$9\beta$-$\Delta^{2,5(10)}$-estradiene-$11\beta,17\beta$-diol,
3-methoxy-$17\alpha$-ethyl-$9\beta$-$\Delta^{2,5(10)}$-estradiene-$11\beta,17\beta$-diol,
3-methoxy-$17\alpha$-vinyl-$9\beta$-$\Delta^{2,5(10)}$-estradiene-$11\beta,17\beta$-diol,
3-methoxy-$17\alpha$-ethynyl-$9\beta$-$\Delta^{2,5(10)}$-estradiene-$11\beta,17\beta$-diol,
3-methoxy-$17\alpha$-propargyl-$9\beta$-$\Delta^{2,5(10)}$-estradiene-$11\beta,17\beta$-diol,
3-methoxy-$17\alpha$-dimethyl-$9\beta$-$\Delta^{2,5(10)}$-estradiene-$11\beta,17\beta$-diol,
1-methyl-3-methoxy-$17\alpha$-ethyl-$9\beta$-$\Delta^{2,5(10)}$-estradiene-$11\beta,17\beta$-diol,
1-methyl-3-methoxy-$17\alpha$-vinyl-$9\beta$-$\Delta^{2,5(10)}$-estradiene-$11\beta,17\beta$-diol,
1-methyl-3-methoxy-$17\alpha$-ethynyl-$9\beta$-$\Delta^{2,5(10)}$-estradiene-$11\beta,17\beta$-diol, and
1-methyl-3-methoxy-$17\alpha$-propargyl-$9\beta$-$\Delta^{2,5(10)}$-estradiene-$11\beta,17\beta$-diol, respectively.

*Example XXIV*

The $\Delta^{2,5(10)}$-dienes prepared as described in Example XXIII hereinabove were hydrolyzed in the manner described in Example VI hereinabove, thus giving 19-nor-$9\beta,10\alpha$-$\Delta^4$-androstene-$11\beta,17\beta$-diol-3-one,
$1\alpha$-methyl-19-nor-$9\beta,10\alpha$-$\Delta^4$-androstene-$11\beta,17\beta$-diol-3-one,
$17\alpha$-methyl-19-nor-$9\beta,10\alpha$-$\Delta^4$-androstene-$11\beta,17\beta$-diol-3-one,
$17\alpha$-ethyl-19-nor-$9\beta,10\alpha$-$\Delta^4$-androstene-$11\beta,17\beta$-diol-3-one,
$17\alpha$-vinyl-19-nor-$9\beta,10\alpha$-$\Delta^4$-androstene-$11\beta,17\beta$-diol-3-one,
$17\alpha$-ethynyl-19-nor-$9\beta,10\alpha$-$\Delta^4$-androstene-$11\beta,17\beta$-diol-3-one,
$17\alpha$-propargyl-19-nor-$9\beta,10\alpha$-$\Delta^4$-androstene-$11\beta,17\beta$-diol-3-one,
$1\alpha,17\alpha$-dimethyl-19-nor-$9\beta,10\alpha$-$\Delta^4$-androstene-$11\beta,17\beta$-diol-3-one,
$1\alpha$-methyl-$17\alpha$-ethyl-19-nor-$9\beta,10\alpha$-$\Delta^4$-androstene-$11\beta,17\beta$-diol-3-one,
$1\alpha$-methyl-$17\alpha$-vinyl-19-nor-$9\beta,10\alpha$-$\Delta^4$-androstene-$11\beta,17\beta$-diol-3-one,
$1\alpha$-methyl-$17\alpha$-ethynyl-19-nor-$9\beta,10\alpha$-$\Delta^4$-androstene-$11\beta,17\beta$-diol-3-one, and
$1\alpha$-methyl-$17\alpha$-propargyl-19-nor-$9\beta,10\alpha$-$\Delta^4$-androstene-$11\beta,17\beta$-diol-3-one, respectively.

*Example XXV*

19-nor-$9\beta,10\alpha$-$\Delta^4$-androstene - $11\beta,17\beta$ - diol-3-one and the corresponding $1\alpha$-methyl compound were oxidized, using chromium trioxide in pyridine in the manner described in Example VII hereinabove, thus giving 19-nor-$9\beta,10\alpha$-$\Delta^4$-androstene-3,11,17-trione and $1\alpha$-methyl-19-nor-$9\beta,10\alpha$-$\Delta^4$-androstene-3,11,17-trione.

*Example XXVI*

19-nor-$9\beta,10\alpha$-$\Delta^4$-androstene-$11\beta,17\beta$-diol-3-one and the corresponding $1\alpha$-methyl compound were esterified, using 1.1 mols of acetic anhydride in pyridine, in the manner described in Example XI hereinabove, thus giving 19-nor-$9\beta,10\alpha$-$\Delta^4$-androstene-$11\beta,17\beta$-diol-3-one 17-acetate and $1\alpha$-methyl-19-nor-$9\beta,10\alpha$-$\Delta^4$-androstene - $11\beta,17\beta$ - diol-3-one 17-acetate.

By repeating this procedure using each of the steroid starting materials just mentioned and replacing acetic anhydride with propionic, cyclopentylpropionic and caproic anhydride, respectively, the corresponding 17-propionates, -cyclopentylpropionates and -caproates were obtained.

*Example XXVII*

19-nor-$9\beta,10\alpha$-$\Delta^4$-androstene-$11\beta,17\beta$-diol-3-one 17-acetate and $1\alpha$-methyl-19-nor-$9\beta,10\alpha$-$\Delta^4$-androstene-$11\beta,17\beta$-diol-3-one 17-acetate were oxidized, using chromium trioxide in pyridine in the manner described in Example VII hereinabove, thus giving 19-nor-$9\beta,10\alpha$-$\Delta^4$-androsten-$17\beta$-ol-3,11-dione 17-acetate and $1\alpha$-methyl-19-nor-$9\beta,10\alpha$-$\Delta^4$-androsten-$17\beta$-ol-3,11-dione 17-acetate.

*Example XXVIII*

The $17\alpha$-substituted steroids prepared as described in Example XXIV hereinabove were esterified, using acetic anhydride in benzene in the presence of p-toluenesulfonic acid, and the intermediate 3-enol acetates were hydrolyzed, using methanolic hydrochloric acid, in the manner described in Example XII hereinabove, thus giving 17α-methyl-19-nor-9β,10α-Δ⁴-androstene-11β,17β-diol-3-one 11,17-diacetate,
17α-ethyl-19-nor-9β,10α-Δ⁴-androstene-11β,17β-diol-3-one 11,17-diacetate,
17α-vinyl-19-nor-9β,10α-Δ⁴-androstene-11β,17β-diol-3-one 11,17-diacetate,
17α-ethynyl-19-nor-9β,10α-Δ⁴-androstene-11β,17β-diol-3-one 11,17-diacetate,
17α-propargyl-19-nor-9β,10α-Δ⁴-androstene-11β,17β-diol-3-one 11,17-diacetate,
1α,17α-dimethyl-9-nor-9β,10α-Δ⁴-androstene-11β,17β-diol-3-one 11,17-diacetate,
1α-methyl-17α-ethyl-19-nor-9β,10α-Δ⁴-androstene-11β,17β-diol-3-one 11,17-diacetate,
1α-methyl-17α-vinyl-19-nor-9β,10α-Δ⁴-androstene-11β,17β-diol-3-one 11,17-diacetate,
1α-methyl-17α-ethynyl-19-nor-9β,10α-Δ⁴-androstene-11β,17β-diol-3-one 11,17-diacetate, and
1α-methyl-17α-propargyl-19-nor-9β,10α-Δ⁴-androstene-11β,17β-diol-3-one 11,17-diacetate, respectively.

By repeating this entire procedure using propionic, cyclopentylpropionic, and caproic anhydrides in place of acetic anhydride, the corresponding 11,17-dipropionates, -dicyclopentylpropionates and -dicaproates were obtained.

Example XXIX

A suspension of 1 gram of 17α-methyl-19-nor-9β,10α-Δ⁴-androstene-11β,17β-diol-3-one 11,17-diacetate in 60 cc. of methanol was admixed with a solution of 1 gram of potassium bicarbonate in 6 cc. of water, and the resulting reaction mixture was allowed to stand at 0° C. for 18 hours. Following this reaction period the reaction mixture was diluted with water and the resulting precipitate was collected by filtration, washed with water and dried. Recrystallization from acetone/hexane gave 17α-methyl-19-nor-9β,10α-Δ⁴-androstene-11β,17β-diol-3-one 17-acetate.

By repeating this procedure using the remaining 11,17-diacetates, -dipropionates, -dicyclopentylpropionates and -dicaproates prepared as described in Example XXVIII hereinabove, the corresponding 17-monoesters were obtained.

Example XXX

The 17-monoacetates prepared as described in Example XXIX hereinabove were oxidized, using chromium trioxide in pyridine in the manner described in Example VII hereinabove, thus giving 17α-methyl-19-nor-9β,10α-Δ⁴-androsten-17β-ol-3,11-dione 17-acetate,
17α-ethyl-19-nor-9β,10α-Δ⁴-androsten-17β-ol-3,11-dione 17-acetate,
17α-vinyl-19-nor-9β,10α-Δ⁴-androsten-17β-ol-3,11-dione 17-acetate,
17α-ethynyl-19-nor-9β,10α-Δ⁴-androsten-17β-ol-3,11-dione 17-acetate,
17α-propargyl-19-nor-9β,10α-Δ⁴-androsten-17β-ol-3,11-dione 17-acetate,
1α,17α-dimethyl-19-nor-9β,10α-Δ⁴-androsten-17β-ol-3,11-dione 17-acetate,
1α-methyl-17α-ethyl-19-nor-9β,10α-Δ⁴-androsten-17β-ol-3,11-dione 17-acetate,
1α-methyl-17α-vinyl-19-nor-9β,10α-Δ⁴-androsten-17β-ol-3,11-dione 17-acetate,
1α-methyl-17α-ethynyl-19-nor-9β,10α-Δ⁴-androsten-17β-ol-3,11-dione 17-acetate, and
1α-methyl-17α-propargyl-19-nor-9β,10α-Δ⁴-androsten-17β-ol-3,11-dione 17-acetate, respectively.

Example XXXI 3-methoxy-17-cycloethylenedioxy-9β-Δ$^{1,3,5(10)}$-estratrien-11β-ol and 1-methyl-3-methoxy-17-cycloethylenedioxy-9β-Δ$^{1,3,5(10)}$-estratrien-11β-ol, prepared as described in Example XIX hereinabove, were treated with lithium in liquid ammonia in the manner described in Example V hereinabove, thus giving 3-methoxy-17-cycloethylenedioxy-9β-Δ$^{2,5(10)}$-estradien-11β-ol and the corresponding 1-methyl compound.

Example XXXII

The Δ$^{2,5(10)}$-dienes prepared as described in Example XXXI hereinabove were hydrolyzed in the manner described in Example VI, hereinabove, thus giving 19-nor-9β,10α-Δ⁴-androsten-11β-ol-3,17-dione and 1α-methyl-19-nor-9β,10α-Δ⁴-androsten-11β-ol-3,17-dione.

It will be obvious to those skilled in the art that other changes and variations can be made in carrying out the present invention without departing from the spirit and scope thereof as defined in the appended claims.

We claim:
1. 1α,17α-dimethyl-19-nor-9β,10α-Δ⁴-androsten-17β-ol-3-one.
2. 1α-methyl-17α-ethynyl-19-nor-9β,10α-Δ⁴-androsten-17β-ol-3-one.
3. 19-nor-9β,10α-Δ⁴-androstene-3,11,17-trione.
4. 19-nor-9β,10α-Δ⁴-androsten-11β-ol-3,17-dione.
5. 17α-methyl-19-nor-9β,10α-Δ⁴-androstene-11β,17β-diol-3-one.
6. 17α-methyl-19-nor-9β,10α-Δ⁴-androstene-11β,17β-diol-3-one 17-acetate.
7. 17α-ethynyl-19-nor-9β,10α-Δ⁴-androstene-11β,17β-diol-3-one.
8. 17α-ethynyl-19-nor-9β,10α-Δ⁴-androstene-11β,17β-diol-3-one 17-acetate.
9. 17α-methyl-19-nor-9β,10α-Δ⁴-androsten-17β-ol-3,11-dione 17-acetate.
10. 17α-ethynyl-19-nor-9β,10α-Δ⁴-androsten-17β-ol-3,11-dione 17-acetate.

References Cited
UNITED STATES PATENTS 3,138,617  6/1964  Nomine et al. _____ 260—345.2
3,198,792  8/1965  Reerink et al. _____ 260—239.55

OTHER REFERENCES

Legrand et al., "Compt. Rend. Acad. Sci." (1962), pages 322–324.

ELBERT L. ROBERTS, Primary Examiner.

LEWIS GOTTS, Examiner.